Figure 2:
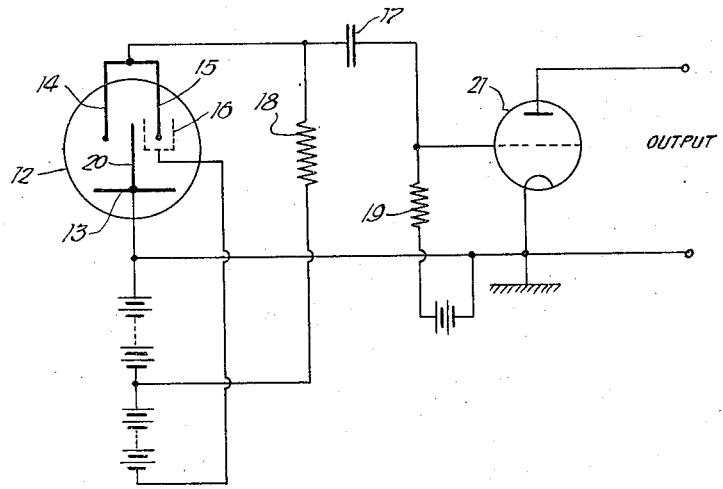

Oct. 11, 1938. G. CLAMANN 2,133,132
METHOD AND MEANS FOR REPRODUCING BALANCED SOUND RECORDS
Filed Nov. 4, 1937 2 Sheets-Sheet 1
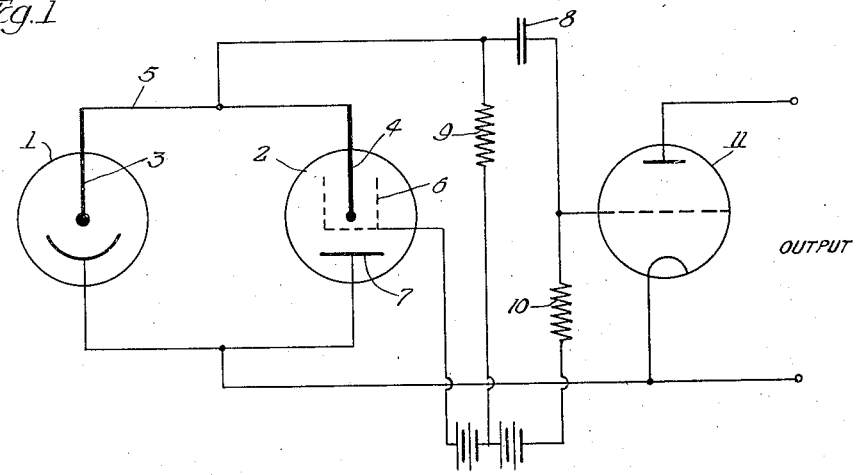
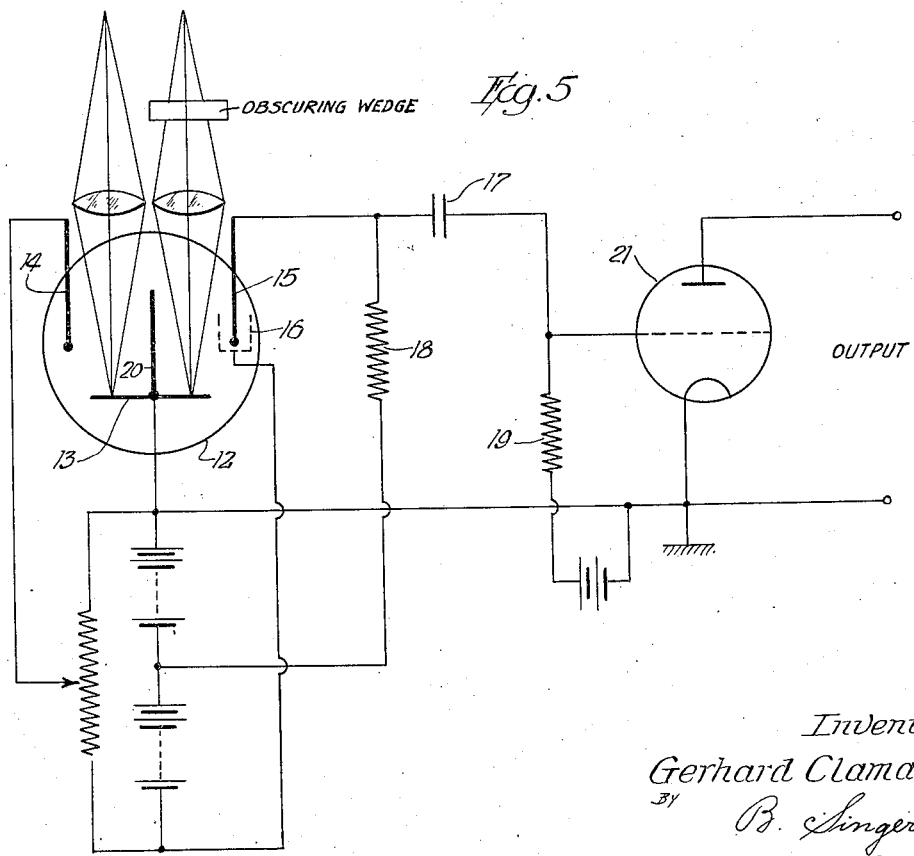
Inventor
Gerhard Clamann
By B. Singer
Atty.

Inventor
Gerhard Clamann
By B. Singer
Atty.

Patented Oct. 11, 1938

2,133,132

UNITED STATES PATENT OFFICE 2,133,132

METHOD AND MEANS FOR REPRODUCING BALANCED SOUND RECORDS

Gerhard Clamann, Dresden, Germany, assignor to Zeiss Ikon Aktiengesellschaft, Dresden, Germany Application November 4, 1937, Serial No. 172,744
In Germany November 19, 1936

7 Claims. (Cl. 179—100.3)

The invention relates to improvements in a method and means for reproducing balanced sound records.

Sound records of this type are produced by recording the positive wave portions and the negative wave portions of the oscillation to be recorded upon separate sound tracks. In the reproduction of these records, the sound tracks are separately scanned. After having been scanned separately, the two half-wave portions are combined to form the original oscillation. Since the two half-wave portions are locally spaced on the record carrier, which for instance may consist of a film, but in other respects are completely equivalent, it is necessary when recombining the half-wave portions for the purpose of reproduction to invert the phase of one of these half-wave portions.

It has been proposed heretofore to employ for the purpose stated two photoelectric tubes which either are connected in opposition to each other or are connected by means of a coupling transformer, which effects the inversion of the phase, with the first amplifier tube. It is also known to employ a single balancing tube provided with a single cathode and two separated anodes in an appropriate circuit arrangement.

All of these prior arrangements have the disadvantage that they require a considerable number of auxiliary elements, as for instance, resistances, condensers and transformers. Certain of these elements have to be arranged at the input of the amplifier and are extremely sensitive to electrical or magnetical disturbances. As an example of such an element may be mentioned the coupling transformer between the photoelectric tube and the grid of the first amplifier tube. On the other hand, certain of these auxiliary elements have to be located in most instances directly at the sound scanning station where owing to lack of space, these elements can be arranged with difficulty only.

It is now the principal object of the invention to eliminate the disadvantages inherent in the arrangements of the prior art. According to the invention one of the two sound tracks representing one-half wave of the oscillation is scanned by a photo-electric tube from which the electrons enter the outer circuit in one direction while the other sound track, representing the other half-wave of the oscillation, is scanned by another photo-electric tube through which the electrons pass in the opposite direction.

One object of the invention therefore is to use for the scanning of the two sound tracks two separately arranged and different light sensitive elements and another object of the invention is to employ for the same purpose a single light sensitive element provided with a common cathode and two spaced anodes.

Figure 3:
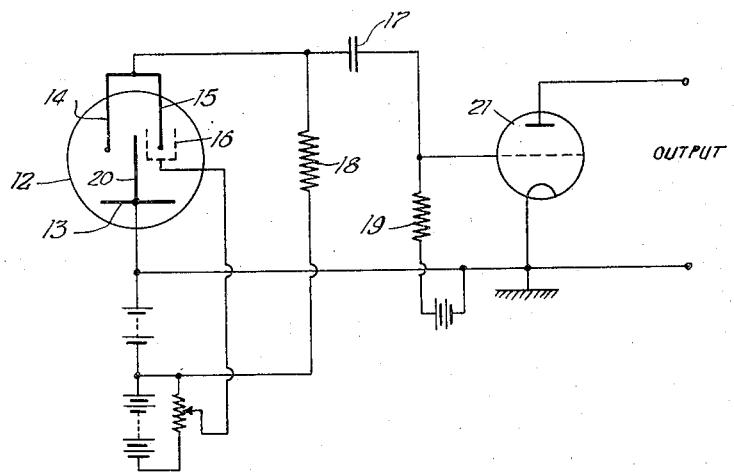
Figure 4:
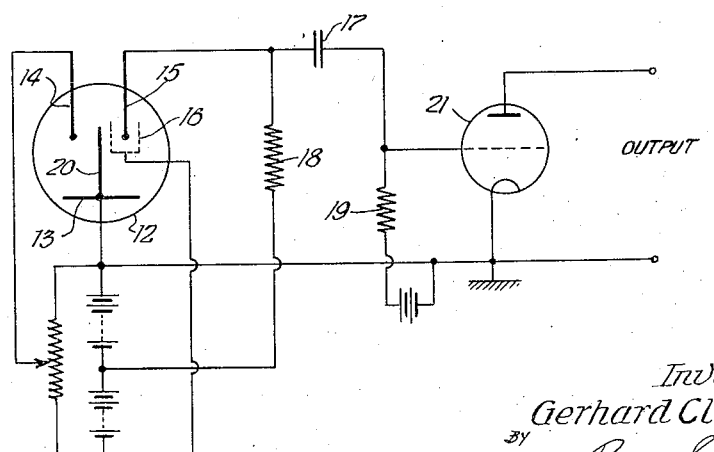

In the drawings:

Fig. 1 illustrates diagrammatically an arrangement employing two separate photo-electric tubes, and Fig. 2 illustrates diagrammatically a modified arrangement employing a single photo-electric tube provided with a common cathode and two anodes, and Figs. 3, 4 and 5 illustrate modifications of the arrangement of Fig. 2.

In Fig. 1 the photo-electric tube 1 is of conventional construction, while the photo-electric tube 2 is constructed to effect a release of secondary electrons thereby causing the desired inversion of the phase. The anodes 3 and 4 of the tubes 1 and 2 respectively are connected with each other by a conductor 5. The photoelectric tube 2 is equipped with an auxiliary anode 6 of screen formation. This auxiliary anode 6 is arranged to surround the primary anode 4 of the tube 2. The auxiliary anode 6 is related to the cathode 7 in a manner to permit passage of alternating current only and also has with respect to the cathode 7 a positive potential. This positive potential is higher than the negative potential applied to the main anodes 3 and 4. The condenser 8 and the coupling resistors 9 and 10 are of conventional construction and are used for connecting the photo-electric tubes to the input tube 11 of the amplifier. These conventional elements may be conveniently mounted within the amplifier structure.

Fig. 2 illustrates a modified embodiment in which the anodes and cathodes of the two separate photo-electric tubes of Fig. 1 are located within the same envelope 12. The two anodes, however, are combined to form the common cathode 13. In this figure, the anodes are indicated at 14 and 15, and the anode 15 is surrounded by an auxiliary screen anode 16. The common cathode 13 is provided with a shield 20 for preventing the flow of electrons from one cathode portion to the other.

The auxiliary screen anode 16 is related to the cathode 13 to permit passage of alternating current only and again has a positive potential with respect to the cathode. This positive potential supplied by a direct current source is higher than the negative voltage applied to the two anodes 14 and 15. The condenser 17 and the coupling resistors 18 and 19 are again of conventional construction and are used for connecting the photoelectric tube with the input tube 21 of the amplifier. These conventional connector elements may be conveniently mounted within the amplifier structure.

The operation of these two arrangements is the same. It is described in the following with reference to the second embodiment.

A beam of light scanning one of the two sound tracks (not shown) may be assumed to strike the cathode 13 solely on one side of the cathode. The other beam of light, scanning the other sound track, strikes the cathode solely on the other side of the shield 20, namely the right hand portion of the cathode in such manner, that in accordance with the principle of balanced scanning one portion of the cathode is dark, while the other one is illuminated, and vice versa. The light impulses acting upon the left hand portion of the cathode 13 release in known manner a photo-current which causes a corresponding drop of voltage in the resistors 18 and 19. The light impulses striking the portion of the cathode on the right side of the shield 20 produce primarily a photo-current of the same value and direction as produced by the other half of the tube. But when the electrons strike the anode 15, which is constructed so as to emit secondary electrons, a current of secondary electrons is released, which secondary electrons are attracted by the auxiliary anode 16 provided the latter is positively charged with respect to the anode 15. A flow of electrons from the anode 15 to the auxiliary anode 16 therefore takes place. The outer current resulting from this condition consists of the difference between the flow of electrons striking the anode and the flow of electrons leaving the anode.

If now, the ratio:

$$\frac{\text{number of secondary electrons}}{\text{number of primary electrons}} = 2$$

then the outer current upon illumination of the right hand portion of the cathode 13 has the same intensity, but is of opposite phase as the current produced upon illumination of the left hand portion of the cathode 13.

The anode 15 as already stated above, consists of a material having the capacity of emitting a strong flow of secondary electrons.

The ratio value 2 referred to above need not be adhered to very accurately. The same balancing condition may be attained by varying the voltage difference between the auxiliary anode 16 and the main anodes 14 and 15, or it may be attained by providing the anode 14 with a separate potential. This separate potential may then be adjusted in such manner that sensitiveness of the anode 14 is made equal to the sensitiveness of the anode 15 emitting secondary electrons, which applies particularly to gas filled tubes.

Finally, the balancing of sensitiveness may also be attained by arranging in one or both branches of the path of light to the photoelectric tube or tubes diaphragms, obscuring wedges or similar elements.

What I claim is:

1. In a method of reproducing balanced double track sound records, the steps of separately scanning photoelectrically the half-waves in each track of the sound record and producing a multiple of secondary electrons by the primary electrons generated during the scanning of one of said sound tracks, so that the electron flow resulting from the two emissions of electrons flows in a direction opposite to the flow of the primary electrons produced during the scanning of the other one of said sound tracks, whereby the two half-waves of the sound record reproduced thereby are arranged in phase opposition.

2. In a system for reproducing balanced double track sound records, the combination of two light sensitive elements, one for each sound track and adapted to be energized by a beam of light scanning the half-waves in the sound track, one of said elements being provided with means for causing the electrons generated by the light scanning the sound track to produce multiplied secondary electrons so that the resulting electron current in said light sensitive element flows in a direction opposite to the flow of the electrons produced in the other light sensitive element, whereby the two half-waves of the sound record reproduced thereby are arranged in phase opposition.

3. In a system for reproducing balanced double track sound records, the combination of two photoelectric tubes, one for each sound track and adapted to be energized by a beam of light scanning the half-waves in said sound track, one of said photoelectric tubes being provided with an anode adapted to emit multiplied secondary electrons when struck by the primary electrons produced in response to the beam of light scanning the sound track, an auxiliary anode associated with said anode for attracting said secondary electrons and effective to invert the phase of the half-waves of the respective sound track, whereby the two half-waves of the sound record reproduced thereby are arranged in phase opposition.

4. In a system for reproducing balanced double track sound records, the combination of two photoelectric tubes, one for each sound track and adapted to be energized by a beam of light scanning the half-waves in said sound track, one of said photoelectric tubes being provided with an anode adapted to emit substantially twice as many secondary electrons as the number of primary electrons striking the same, said primary electrons being produced in response to the beam of light scanning the sound track, an auxiliary anode associated with said anode for attracting said secondary electrons and effective to invert the phase of the half-waves of the respective sound track, whereby the two half-waves of the sound record reproduced thereby are arranged in phase opposition.

5. In a system for reproducing balanced double track sound records, a photoelectric tube comprising within an envelope, two separate anodes and a common cathode, a shield on said cathode and dividing the same in two portions, each of which being positioned opposite one of said anodes, said shield preventing the electrons produced on one portion of said cathode in response to a light beam scanning the half-waves in one of said sound tracks from passing to the other cathode portion which is adapted to be struck by a light beam scanning the half-waves in the other sound track, one of said anodes being adapted to emit multiplied secondary electrons when struck by the primary electrons coming from the respective cathode portion, and an auxiliary screen anode surrounding said last named anode and being effective to invert the phase of the half-waves of the respective sound track, whereby the two half-waves of the sound record reproduced thereby are arranged in phase opposition.

6. In a system for reproducing balanced double track sound records, the combination of two photoelectric means, one for each sound track and adapted to be energized by a beam of light scanning the half-waves in the sound track, one of said photoelectric means being provided with means for causing the electrons produced by the light scanning the sound track to produce multiplied secondary electrons so that the resulting electron current in said photoelectric means flows in a direction opposite to the flow of the electrons produced in the other photoelectric means, whereby the reproduced two half-waves of the sound record are in phase opposition, and adjustable light absorbing means positioned in the path of at least one of the two separate light beams scanning said two sound tracks for balancing the sensitiveness of said two photoelectric means.

7. In a system for reproducing balanced double track sound records, a photoelectric tube comprising within an envelope, two separate anodes and a common cathode, a shield on said cathode and dividing the same in two portions, each of which being positioned opposite one of said anodes, said shield preventing the electrons produced on one portion of said cathode in response to a light beam scanning the half-waves in one of said sound tracks from passing to the other cathode portion which is adapted to be struck by a light beam scanning the half-waves in the other sound track, one of said anodes being adapted to emit multiplied secondary electrons when struck by the primary electrons coming from the respective cathode portion, an auxiliary screen anode surrounding said last named anode and being effective to invert the phase of the half-waves of the respective sound track, whereby the two half-waves of the sound record reproduced thereby are arranged in phase opposition, and means for applying a separate variable potential to at least one of said anodes for balancing the electron production.

GERHARD CLAMANN.